United States Patent
Kawada et al.

(10) Patent No.: US 6,813,379 B2
(45) Date of Patent: Nov. 2, 2004

(54) IMAGE SEGMENTATION APPARATUS

(75) Inventors: Ryoichi Kawada, Tokyo (JP); Atsushi Koike, Tokyo (JP); Shuichi Matsumoto, Tokyo (JP)

(73) Assignee: KDDI R&D Laboratories, Inc., Kamifukuoka (JP)

( * ) Notice: Subject to any disclaimer, the term of this patent is extended or adjusted under 35 U.S.C. 154(b) by 617 days.

(21) Appl. No.: 09/933,073

(22) Filed: Aug. 21, 2001

(65) Prior Publication Data

US 2002/0041711 A1 Apr. 11, 2002

(30) Foreign Application Priority Data

Aug. 23, 2000 (JP) ........................................ 2000-252424

(51) Int. Cl.[7] .............................................. G06K 9/34
(52) U.S. Cl. .................. 382/173; 382/236; 375/240.08; 375/240.12
(58) Field of Search ................................ 382/173, 108, 382/232, 233, 236, 238, 243, 239; 375/240, 240.01–240.02, 240.08, 240.12–240.17, 240.18–240.2, 240.27, 240.28, 240.24, 240.06; 348/554; 709/247

(56) References Cited

U.S. PATENT DOCUMENTS

| | | | | |
|---|---|---|---|---|
| 5,144,426 A | * | 9/1992 | Tanaka et al. | 375/240.13 |
| 5,969,764 A | * | 10/1999 | Sun et al. | 375/240.06 |
| 6,005,980 A | * | 12/1999 | Eifrig et al. | 382/236 |
| 6,377,309 B1 | * | 4/2002 | Ito et al. | 348/554 |

FOREIGN PATENT DOCUMENTS

| | | | |
|---|---|---|---|
| JP | 11-41611 | 2/1999 | |
| JP | 11041611 | * 12/1999 | ............ H04N/7/32 |

OTHER PUBLICATIONS

Eryurtlu et al., Very low–bit–rate segmentation–based video coding using contour and texture prediction, IEEE, vol. 142, ISSN 1350–245X, pp. 253–261.*

* cited by examiner

Primary Examiner—Leo Boudreau
Assistant Examiner—Ishrat Sherali
(74) Attorney, Agent, or Firm—Westerman, Hattori, Daniels & Adrian, LLP

(57) ABSTRACT

A shape entropy, a motion vector entropy, and a texture entropy of a certain area i of an input image are derived by a shape entropy calculation section, a motion vector entropy calculation section, and a texture entropy calculation section, respectively. Among them, the texture entropy is derived by taking an allowed value n of encoding degradation given according to a limit (encoding rate) of an entropy which can transmitted into consideration. Therefore, a generated entropy obtained by adding up the shape entropy, the motion vector entropy, and the texture entropy becomes a value according to the encoding rate. In such optimizing segmentation encoding as to minimize the generated entropy, therefore, it becomes possible to conduct segmentation according to the encoding rate. According to the present invention, there is provided an image segmentation apparatus capable of conducting such optimizing segmentation as to minimize the generated entropy while taking the limit (encoding rate) of the entropy which can be transmitted into consideration.

4 Claims, 2 Drawing Sheets

IMAGE SEGMENTATION APPARATUS

FIELD OF THE INVENTION

The present invention relates to an image segmentation apparatus which is suitable for the case where segmentation according to an encoding rate is conducted in optimizing segmentation encoding which minimizes the generated entropy.

DESCRIPTION OF THE RELATED ART

In optimal segmentation for encoding, it is necessary to previously estimate generated entropies or data quantities from areas for each of segments. As a prior art of this optimal segmentation method, for example, there is a technique described in Japanese Patent Application Laid-Open No. 11-41611 assigned to the present assignee.

According to this prior art, it is possible to conduct such segmentation as to minimize the total generated entropy which is a sum total of a motion vector entropy, a shape entropy, and a texture entropy (which is equal to a prediction error entropy in the case of motion compensative encoding).

As for the motion vector entropy included in the generated entropies, a certain entropy can be estimated fixedly per motion vector. Furthermore, the shape entropy can be estimated by using a method described in Japanese Patent Application Laid-Open No. 11-41596 assigned to the present assignee.

Furthermore, as for the estimation of the texture entropy, the following method is conceivable. In other words, assuming that a texture signal of an area to be encoded can be approximated by, for example, Laplace distribution, its signal variance is $\sigma^2$, and the number of pixels in an area is N, an estimated value $E_1$ of a texture entropy from that area is represented by the following equation (1).

$$E_1 = N/2 \cdot \log_2 2e^2\sigma^2 [\text{bits}] \qquad (1)$$

This equation is based on a texture signal of that area before quantization.

As a matter of fact, however, there is a restriction in the entropy which can be transmitted. In other words, the transmission rate is finite. Therefore, the entropy of the texture signal is typically reduced by quantization. Especially in the case of a low bit rate, it happens that the signal becomes 0 in some portions of an image, as a result of "truncation", i.e., quantization.

From the equation (1), it is usual for the texture entropy to differ depending upon the area shape. If truncation occurs, however, the texture entropy eventually becomes zero no matter what shape is assumed. It is desirable in this case to adopt such a shape as to reduce the shape entropy as much as possible.

As a matter of fact, there is a limit in the entropy which can be transmitted. In some cases, therefore, the texture entropy of the equation (1) becomes zero. In this case, however, it is not considered in the prior texture entropy estimation method of the equation (1) to adopt such a shape as to reduce the shape entropy as much as possible. Especially in a low bit rate, therefore, if segments become too fine, the shape entropy occupies a large part of the total generated entropy. Eventually, this results in a problem that the image quality degradation becomes remarkable.

SUMMARY OF THE INVENTION

An object of the present invention is to provide an image segmentation apparatus capable of conducting such optimizing segmentation as to minimize the generated entropy while taking a limit of the entropy which can be transmitted (encoding rate) into consideration.

In order to accomplish the object, a feature of this invention resides in that an image segmentation apparatus comprises first means for estimating a shape entropy of a certain area of an image signal; second means for estimating a motion vector entropy of the region; third means for estimating a texture entropy based on a signal variance of the area and an allowed value of encoding degradation determined according to an encoding rate; and means for adding up the entropies derived by the first to third means and thereby estimating a generated entropy of the area.

According to this feature, an encoding degradation value determined according to the encoding rate is added to estimation of the texture entropy. As a result, segmentation according to a given encoding rate can be conducted.

DETAILED DESCRIPTION OF THE PREFERRED EMBODIMENTS

Figure 1:
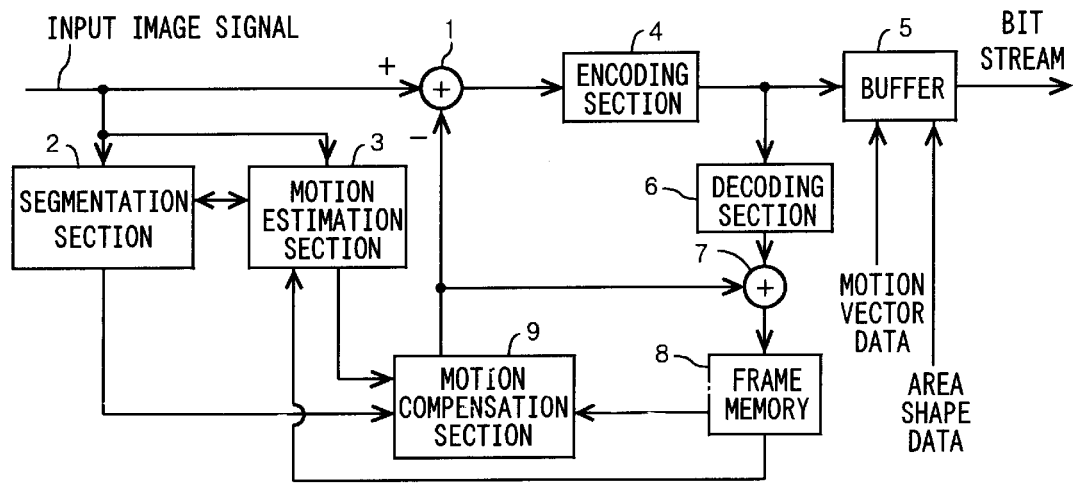
FIG. 1 is a block diagram showing a configuration of a segmentation encoding apparatus to which the present invention is applied.

Hereinafter, the present invention will be described in detail by referring to the drawing. FIG. 1 is a block diagram showing a configuration of a segmentation encoding apparatus to which the present invention is applied.

In FIG. 1, an input image (or picture) signal is input to a subtracter 1. In addition, the input image signal is input to a segmentation section 2 and a motion estimation section 3. By operation described later, the segmentation section 2 conducts such optimal segmentation as to minimize the generated entropy while taking a limit of the entropy which can be transmitted into consideration. The subtracter 1 subtracts a reference image signal output by a motion compensation section 9 from the input image signal. A prediction error signal obtained by this subtraction is encoded by an encoding section 4, which includes, for example, an orthogonal transform section and a quantization section, and then is output to an external line via a buffer 5 as a bit stream. The bit stream includes the encoded signal of the image, motion vector data, and area shape data.

In addition, the signal encoded by the encoding section 4 is decoded by a decoding section 6, added to the reference image signal output from the motion compensation section 9 by an adder 7, and stored in a frame memory 8. On the basis of the segmentation data supplied from the segmentation section 2, the motion estimation section 3 receives the input image signal and a decoded signal of a previous frame supplied from the frame memory 8, and estimates an area motion.

Figure 2:
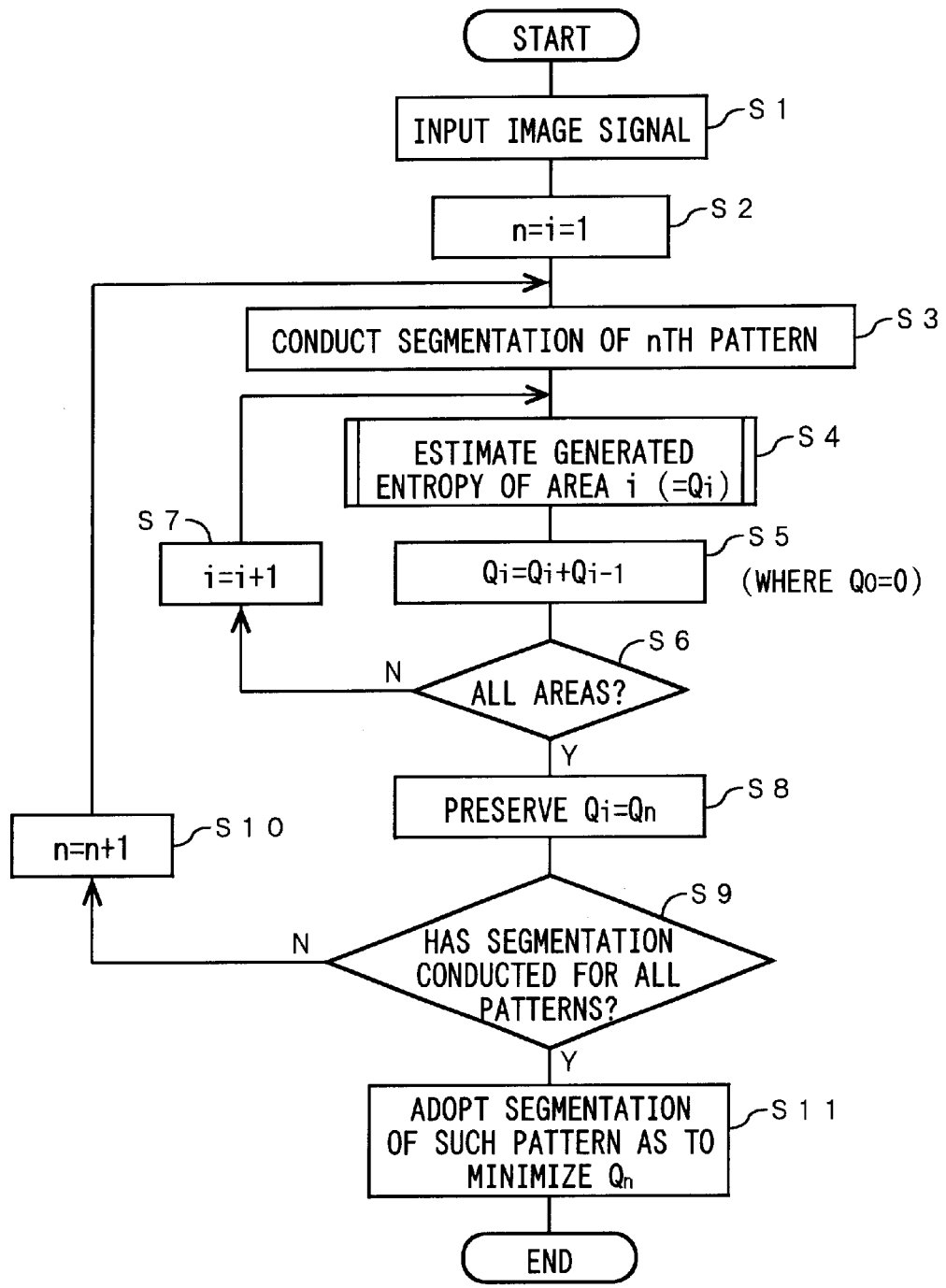
FIG. 2 is a flow chart showing a function of a segmentation section shown in FIG. 1.

A function of the segmentation section 2 which is an embodiment of the present invention will now be described by referring to a flow chart of FIG. 2. At step S1, for example, an image signal of one macro block (16 by 16 pixels) is input. At step S2, n and i are set equal to 1. At step S3, segmentation of an nth pattern is conducted. At step S4, a generated entropy of a certain area i of the image obtained by the segmentation is estimated. (An estimated value of the generated entropy=$Q_i$.) The estimation of the generated entropy is conducted by taking a limit of the entropy which can be transmitted into consideration, in accordance with the present invention. Details thereof will be described later by referring to FIG. 3.

At step S5, operation of $Q_i=Q_i+Q_{i-1}$ is conducted (where $Q_0=0$). In other words, $Q_i$ is accumulated. At step S6, it is determined whether the estimation of the generated entropy has been finished for all areas obtained by the segmentation of the nth pattern. If the decision is negative, then the processing proceeds to step S7, where i is incremented by 1 and the area to be processed is updated. Subsequently, the processing returns to the step S4 again, and estimation of the generated entropy of an area (i+1) is conducted. The processing heretofore described is continued repetitively. If the decision of the step S6 becomes affirmative, then the processing proceeds to step S8, and an estimation $Q_n$ of the total generated entropy for the segmentation of the nth pattern is preserved.

Subsequently, at step S9, it is determined whether segmentation of all patterns has been conducted. If the decision is negative, the processing proceeds to step S10 and 1 is added to n. At step S3, segmentation of an (n+1)th pattern, which is another segmentation different from the nth pattern, is conducted. Subsequently, the operation of the steps S4 to S9 is conducted again. By such operation, estimation values $Q_1$ to $Q_n$ (all) of the generated entropy of all patterns ranging from the first pattern to a scheduled pattern are obtained. If the decision of the step S9 becomes affirmative, the processing proceeds to step S11, and segmentation of a pattern having a minimum value among the estimation values $Q_1$ to $Q_n$ (all) of the generated entropy is adopted.

Figure 3:
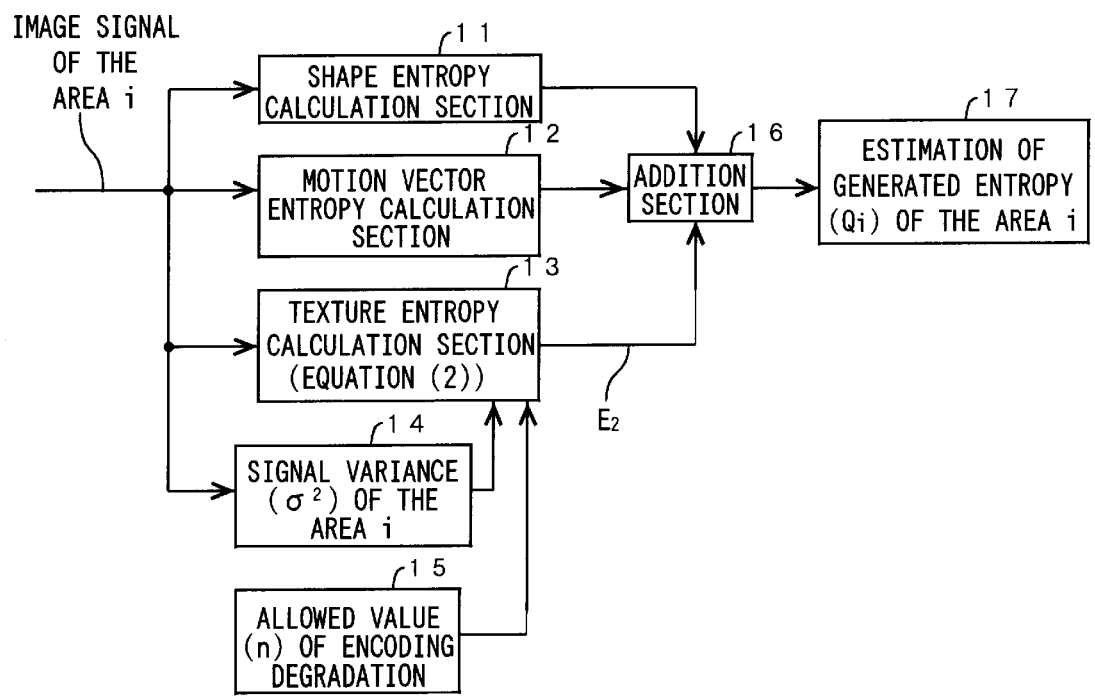
FIG. 3 is a block diagram showing a function of step S4 shown in FIG. 2.

Details of the operation of the step S4 will now be described by referring to a block diagram of FIG. 3. FIG. 3 is a diagram showing the function of the step S4. An image signal of the area i is input to a shape entropy calculation section 11, a motion vector entropy calculation section 12, and a texture entropy calculation section 13. The shape entropy calculation section 11 and the motion vector entropy calculation section 12 calculate a shape entropy and a motion vector entropy of the area i, respectively. However, since these are the same as those of the prior art, description of them will be omitted.

As for the calculation of the texture entropy $E_2$ in the texture entropy calculation section 13, it is conducted in the prior art according to the equation (1) which uses signal variance $\sigma^2$ (14) of the area. In the present embodiment, however, it is conducted according to the following equation (2) incorporating an allowed value n (15) of encoding degradation.

$$E_2=N/2 \cdot \log_2(\sigma^2/n)[\text{bits}] \quad (2)$$

where, $n \leq \sigma^2$. The value n can be called, for example, encoded noise power of the area. The value n is a value given according to a limit (encoding rate) of the entropy which can be transmitted.

If $n=\sigma^2$ (which corresponds to such a state that encoding noise is large in a low bit rate, or a coefficient truncation state in the case of DCT) in the equation (2), the texture entropy becomes zero no matter what segmentation is adopted, and the difference caused by segmentation disappears. Therefore, such segmentation as to generate shape data as little as possible is desirable.

The allowed value n in the equation (2) is determined according to the entropy which can be transmitted. By introducing the allowed value n of the encoding degradation into the texture entropy calculation section 13, therefore, calculation of the texture entropy $E_2$ while taking the entropy which can be transmitted into consideration becomes possible.

The shape entropy derived by the shape entropy calculation section 11, the motion vector entropy derived by the motion vector entropy calculation section 12, and the texture entropy (prediction error entropy) $E_2$ derived by the texture entropy calculation section 13 are added up in an addition section 16. An estimation value $Q_i$ (17) of generated entropy of the area is thus obtained.

Thus, in the step S4 of the present embodiment, the generated entropy is estimated by taking the actual encoding rate into consideration. As compared with the generated entropy derived by using the equation (1) of the prior art, therefore, the estimation is accurate. In the present embodiment, therefore, it becomes possible to execute such optimal segmentation motion estimation as to minimize the generated entropy, on the basis of this accurate estimation of the generated entropy. In other words, image segmentation for segmentation encoding can be made to yield an optimal segmentation according to the encoding rate.

As described above, according to the present invention, estimation of the texture entropy according to supposed encoding degradation can be conducted as evident from the foregoing description. Therefore, it becomes possible to implement optimal segmentation according to the encoding rate.

What is claimed is:

1. An image segmentation apparatus comprising:
    first means for estimating a shape entropy of a certain area of an image signal;
    second means for estimating a motion vector entropy of the region;
    third means for estimating a texture entropy based on a signal variance of the area and an allowed value of encoding degradation determined according to an encoding rate; and
    means for adding up the entropies derived by the first to third means and thereby estimating a generated entropy of the area.

2. An image segmentation apparatus according to claim 1, wherein the third means derives an estimated texture entropy E according to the following equation, $$E=N/2 \cdot \log_2(\sigma^2/n)[\text{bits}]$$

where the number of pixels in a certain area is N, signal variance thereof is $\sigma^2$, and the allowed value of encoding degradation is n.

3. An image segmentation apparatus according to claim 1, wherein segmentation of an image signal is conducted so as to minimize a generated entropy of the image signal derived based on the generated entropy of the area.

4. An image segmentation apparatus according to claim 3, wherein the third means derives an estimated texture entropy E according to the following equation, $$E=N/2 \cdot \log_2(\sigma^2/n)[\text{bits}]$$

where the number of pixels in a certain area is N, signal variance thereof is $\sigma^2$, and the allowed value of encoding degradation is n.

* * * * *